United States Patent [19]

Stirling et al.

[11] Patent Number: 5,672,202
[45] Date of Patent: Sep. 30, 1997

[54] PIGMENT COMPOSITIONS

[75] Inventors: John Andrew Stirling, Glasgow; Carol Jean Farnocchi, Erskine; Edward James Anderson, Kilbarchan, all of Scotland

[73] Assignee: Ciba-Geigy Corporation, Tarrytown, N.Y.

[21] Appl. No.: 696,217

[22] Filed: Aug. 13, 1996

[30] Foreign Application Priority Data

Aug. 18, 1995 [GB] United Kingdom ............... 9516929

[51] Int. Cl.⁶ .................................................. C09B 27/00
[52] U.S. Cl. ........................... 106/496; 106/504; 106/493
[58] Field of Search ............................... 106/496, 504, 106/493

[56] References Cited

U.S. PATENT DOCUMENTS

| | | | |
|---|---|---|---|
| 4,462,833 | 7/1984 | Hays et al. | 106/23 |
| 4,515,639 | 5/1985 | Dopfer et al. | 106/288 |

FOREIGN PATENT DOCUMENTS

| | | |
|---|---|---|
| 0062304 | 10/1984 | European Pat. Off. . |
| 0138104 | 4/1985 | European Pat. Off. . |
| 0651029 | 5/1995 | European Pat. Off. . |
| 1085835 | 10/1967 | United Kingdom . |
| 1156835 | 7/1969 | United Kingdom . |

*Primary Examiner*—Deborah Jones
*Assistant Examiner*—Amy M. Harding
*Attorney, Agent, or Firm*—Michele Kovaleski; Victoria M. Malia

[57] ABSTRACT

The present invention provides a diarylide pigment composition which contains a long chain aliphatic primary amine having 10 to 24 carbon atoms; an ethylene polyamine of the formula $$H_2N(CH_2CH_2NH)_nH$$

where n is 1 to 5; and a propylene triamine of the formula $$RNH(CH_2CH_2CH_2NH)_2H$$

or $$RN(CH_2CH_2CH_2NH_2)_2$$

where R is a long chain alkyl group having 10 to 24 carbon atoms.

16 Claims, No Drawings

PIGMENT COMPOSITIONS

The present invention relates to diarylide pigment compositions and their preparation.

Diarylide pigments represent an important class of colouring materials used commonly for the manufacture of printing inks. Pigment Yellow 12 is a widely used member of the group for solvent based publication gravure printing inks and in this it is commonly surface treated to impart certain desirable applicational properties. In this a typical surface treatment agent is a long chain hydrocarbon amine. GB 1085835 teaches that fatty primary amines may be used to treat Pigment Yellow 12 so as to impart good tinctorial strength, gloss transparency and improved rheology. In U.S. Pat. No. 4,515,639 diamines are also used to treat diarylide pigments so as to reduce penetration of inks therefrom into lower quality uncoated paper stock. There are numerous other patents which describe the use of amine treatments to achieve an improved Pigment Yellow 12 for the preparation of publication gravure inks, e.g. U.S. Pat. No. 4,462,833 and EP 0062304 which describe the use of polyamines.

We have now found that the use of a certain combination of amines which includes, especially, fatty propylene triamines provides a product which has improved strength, gloss and transparency.

Accordingly the present invention provides a diarylide pigment composition which contains a long chain aliphatic primary amine having 10 to 30 carbon atoms; an ethylene polyamine of the formula

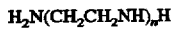

where n is 1 to 5; and a propylene triamine of the formula

or

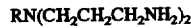

where R is a long chain alkyl group having 10 to 24 carbon atoms.

The diarylide pigment compositions of the present invention may be e.g. Pigment Yellow 12, 13, 14, 17, 83, 114, 126, 127, 176, Pigment Orange 16 or Pigment Orange 34 or combinations or mixtures or co-couplings of these.

A preferred pigment is Pigment Yellow 12 for its extensive use in solvent based publication gravure printing inks.

The long chain aliphatic primary amine may have a long alkyl chain of 10 to 30 carbon atoms, preferably 12 to 22 carbon atoms. Examples of suitable amines include oleyl amine, stearyl amine and laurylamine. The amount of long chain aliphatic primary amine may be from 1 to 15%, preferably from 5 to 10% by weight, based on the weight of pigment.

The ethylene polyamine may be, for example, ethylene diamine, diethylene triamine, triethylene tetramine, tetraethylene pentamine or pentaethylene hexamine. It may be used in an amount of from 4 to 15%, preferably from 5 to 10% by weight based on the weight of pigment.

The propylene triamine preferably has from 10 to 24 carbon atoms in the long chain alkyl group. Examples of suitable compounds include N-stearyl dipropylene triamine, N-oleyl dipropylene triamine, N-coco dipropylene triamine and N,N-di(aminopropyl) stearyl, oleyl or coco amine. The triamine may be used in amounts of from 10 to 45%, preferably from 15 to 30% by weight based on the weight of pigment.

The diarylide pigment compositions of the present invention may be prepared by tetrazotising 3,3'-dichlorobenzidine and coupling with one or more components such as acetoacetanilide, acetoacet-2-toluidide, acetoacet-2-chloroanilide, acetoacet-2,4-xylide and acetoacet-2,5-dimethoxy-4-chloroanilide in water.

Preferred processes may include the addition of the long chain aliphatic amine to precipitate the coupling component, followed by the addition of the ethylene polyamine before coupling, with a quaternary ammonium compound and the propylene triamine being added after coupling.

The quaternary ammonium compound and the propylene triamine may, if desired, be added prior to coupling.

At what point in the process and in what quantity the various additions are made will control the final properties of the pigment. The properties influenced by the particular combination of additions are, strength, shade, gloss, transparency, flow and strike-through.

Enhanced strength, redness of shade, gloss and transparency can be obtained at the expense of flow. If a better flowing product is required, fewer additions should be made before coupling.

The transparency and flow can also be influenced by the addition of a non-volatile water immiscible solvent at the heat treatment stage.

The addition of the ethylene polyamine before coupling has a marked effect on strike-through on poor quality paper.

Examples of suitable quaternary ammonium chlorides include tallow benzyl dimethyl ammonium chloride, coco benzyl dimethyl ammonium chloride, dicoco dimethyl ammonium chloride, ditallow dimethyl ammonium chloride and ditallow benzyl methyl ammonium chloride. The quaternary ammonium chloride may be used in an amount of from 1 to 15%, preferably from 2 to 10% by weight based on the weight of pigment.

Suitable non-volatile, water immiscible solvents are aromatic hydrocarbons, chlorinated hydrocarbons, esters, ethers, nitro compounds, nitriles, hetero cyclic compounds and alkyl carboxylates, specific examples of which are o-dichlorobenzene, dibutyl sebacate, tetralin and dibenzyl ether.

The solvent may be used in amounts of from 1 to 10%, preferably 2 to 6% by weight based on the weight of pigment.

The heating may be carried out at a temperature from 70° to 100° C., preferably from 85° to 95° C. for a time from 5 minutes to 2 hours, preferably from 15 minutes to 1 hour.

The heat treatment is more effective if carried out under alkaline conditions. The increase in pH can be effected before during or after heating.

Publication gravure inks prepared from these compositions show improvements in gloss, transparency, tinctorial strength, and strike through properties.

The following examples further illustrate the present invention:

EXAMPLE 1

27.5 parts of acetoacetanilide are dissolved in 150 parts water which contains 6 parts of sodium hydroxide.

3.0 parts of oleylamine are dissolved in 16 parts of glacial acetic acid in 100 parts of water.

The oleylamine solution is added dropwise to the acetoacetanilide solution to give a fine precipitate.

4.75 parts tetraethylene pentamine are added to this suspension which is then coupled with 19 parts of 3,3'-dichlorobenzidine which has been tetrazotised with 10.5 parts of sodium nitrite and 37.5 parts of 36% strength hydrochloric acid in 200 parts water at 0°–5° C.

To the coupled slurry is added 3 parts of dihydrogenated tallow, dimethyl ammonium chloride in 50 parts of water. This is followed by a solution of 11.25 parts N-stearyl propylene triamine dissolved in 3.5 parts of glacial acetic acid in 150 parts of water. 1 part of dibutyl sebacate is added with good stirring and the pH is made strongly alkaline by addition of 15% strength sodium hydroxide solution. The temperature is then raised to 95° C. and held for 30 minutes.

The product is filtered, washed free of soluble salts and dried.

The easily dispersible pigment, so produced, gives an intense reddish yellow, toluene based gravure ink, resulting in glossy, transparent prints with no strike through.

EXAMPLE 2

Following the procedure of Example 1 but omitting the addition of dibutyl sebacate, a more transparent product is obtained.

EXAMPLE 3

The procedure of Example 1 is used except that N,N-di(aminopropyl)stearylamine is used in place of stearyl propylene triamine. The product is slightly redder than that of Example 1 but similar in all other respects.

EXAMPLE 4

The procedure of Example 1, is used except that N-cocopropylene triamine is used in place of N-stearyl propylene triamine. Similar results are obtained.

EXAMPLE 5

82.5 parts of acetoacetanilide are dissolved in 450 parts of water with 18 parts sodium hydroxide. This is added slowly with good stirring to 9 parts of oleylamine dissolved in 900 parts of water with 48 parts of glacial acetic acid. 14.4 parts of tetraethylene pentamine are added to the resultant fine precipitate.

57 parts of 3,3'-dichlorobenzidine which has been tetrazotised with 31 parts of sodium nitrite and 112.5 parts of 36% strength hydrochloric acid in 660 parts of water at 0°–5° C., are used to effect coupling.

3.8 parts of dihydrogenated tallow dimethyl ammonium chloride in 100 parts of water are added to the coupled slurry, followed by 36.6 parts of N-oleylpropylene triamine dissolved in 300 parts of water to which has been added 7.5 parts of glacial acetic acid.

The pH is made alkaline by addition of 15% strength sodium hydroxide solution and the temperature raised to 95° C. and held for 45 minutes. The resultant product is filtered washed with water and dried to give material with similar properties to that of Example 1.

EXAMPLE 6

The procedure of Example 5 is followed except that 10 parts of laurylamine are used in place of the oleylamine, giving an almost identical product.

EXAMPLE 7

The procedure of Example 5 is followed except that 14.5 parts of oleylamine and 48.5 parts of N-coco propylene triamine are used giving a redder more intense product.

EXAMPLE 8

Following the procedure of Example 5 but using tallow amine in place of oleylamine and coco, benzyl dimethyl ammonium chloride as the quaternary compound, a product with improved flow is obtained.

EXAMPLE 9

Following the procedure of Example 5 but using a mixture of 10.4 g acetoacet-o-anisidide and 72.6 parts of acetoacetanilide as the coupling component, a strong transparent product is obtained.

EXAMPLE 10

Using the procedure of Example 5 but raising the pH at elevated temperature gives a greener shade product.

EXAMPLE 11

Following the procedure of Example 5 but using pentaethylene hexamine in place of tetraethylene pentamine gives a very similar product.

EXAMPLE 12

The procedure of Example 5 is followed but diethylene triamine is used in place of tetraethylene pentamine to give an almost identical product.

EXAMPLE 13

27.5 parts of acetoacetanilide are dissolved in 150 parts of water with 6 parts of sodium hydroxide. 3 parts of oleylamine are dissolved in 16 parts of glacial acetic acid in 100 parts of water. 11.25 parts of N,N di(amino propyl) stearylamine are dissolved in 3.5 parts glacial acetic acid in 150 parts of water. The amine solutions are mixed together and the acetoacetanilide solution is run in slowly to give a fine precipitate. 4.75 parts of tetraethylene pentamine are added and coupling carried out using 19 parts of 3,3'-dichlorobenzidine tetrazotised as described in Example 1.

3 parts of dihydrogenated tallow dimethyl ammonium chloride in 50 parts of water are added to the coupled slurry. The pH is made alkaline and the temperature raised to 90°–95° C. and held for 30 minutes. The product is isolated by filtration and washing and dried to give material which is noticeably redder and more transparent than that of Example 1.

EXAMPLE 14

The procedure of Example 13 is followed except that the quaternary ammonium compound is added to the amine solution mixture prior to the addition of the coupling component solution. This gives a product that is similar in strength gloss and transparency to that of Example 13 but greener in shade.

I claim:

1. A diarylide pigment composition which contains a long chain aliphatic primary amine having 10 to 30 carbon atoms, an ethylene polyamine of the formula

where n is 1 to 5; and a propylene triamine of the formula

or

where R is a long chain alkyl group having 10 to 24 carbon atoms.

2. A composition as claimed in claim 1 in which the long chain aliphatic primary amine is oleyl amine or stearyl amine.

3. A composition as claimed in claim 1 in which the amount of long chain aliphatic primary amine is from 1 to 15% by weight based on the weight of pigment.

4. A composition as claimed in claim 1 in which the ethylene polyamine is ethylene diamine, diethylene triamine, triethylene tetramine, tetraethylene pentamine or pentaethylene hexamine.

5. A composition as claimed in claim 1 in which the amount of ethylene polyamine is from 4 to 15% by weight based on the weight of pigment.

6. A composition as claimed in claim 1 in which the propylene triamine is N-stearyl dipropylene triamine, N-oleyl dipropylene triamine, N-coco dipropylene triamine or N,N-diaminopropyl) stearyl amine.

7. A composition as claimed in claim 1 in which the amount of propylene triamine is from 15 to 45% by weight based on the weight of pigment.

8. A composition as claimed in claim 1 in which the diarylide pigment is Pigment Yellow 12.

9. A process for the preparation of a diarylide pigment composition which contains a long chain aliphatic primary amine having 10 to 30 carbon atoms, an ethylene polyamine of the formula $$H_2N(CH_2CH_2NH)_nH$$

where n is 1 to 5, and a propylene triamine of the formula $$RNH(CH_2CH_2CH_2NH)_2H$$

or $$RN(CH_2CH_2CH_2NH_2)_2$$

where R is a long chain alkyl group having 10 to 24 carbon atoms, the process which comprises adding a coupling component to the long chain aliphatic primary amine and the ethylene polyamine and then adding the propylene triamine to the pigment after coupling.

10. A process as claimed in claim 9 comprising:

(A) precipitating the coupling component from solution by adding thereto the long chain aliphatic primary amine, (B) adding the ethylene polyamine, (C) effecting coupling, (D) adding a monomethyl or dimethyl quaternary ammonium chloride together with a water immiscible non-volatile solvent, (E) heating the mixture, and (F) adding the propylene triamine while continuing to heat the mixture.

11. A process as claimed in claim 10 where step (D) occurs before step (C).

12. A process as claimed in claim 10 where step (F) occurs before step (C).

13. A process as claimed in claim 10 in which the quaternary ammonium chloride is tallow benzyl dimethyl ammonium chloride, coco benzyl dimethyl ammonium chloride, dicoco dimethyl ammonium chloride, ditallow dimethyl ammonium chloride or ditallow benzyl methyl ammonium chloride.

14. A process as claimed in claim 10 in which the amount of quaternary ammonium chloride is from 1 to 15% by weight based on the weight of pigment.

15. A process as claimed in claim 10 in which the non-volatile solvent is dibutyl sebacate.

16. A process as claimed in claim 10 in which the amount of non-volatile solvent is from 1 to 10% by weight based on the weight of pigment.

* * * * *